Figure 1:
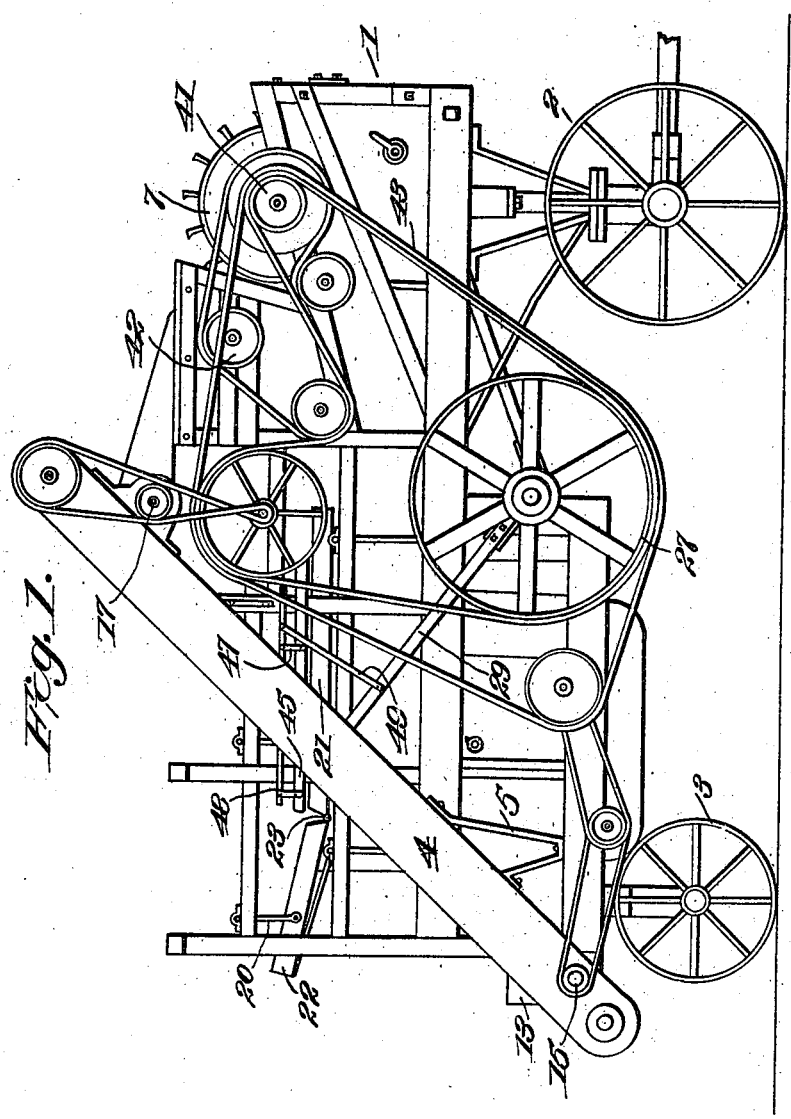

F. McOSKER.
THRESHING MACHINE.
APPLICATION FILED NOV. 8, 1912.

1,174,884.

Patented Mar. 7, 1916.
6 SHEETS—SHEET 1.

Witnesses
E. S. Kramer

Inventor
Frank McOsker
By Frank E. Rapp
Attorney

F. McOSKER.
THRESHING MACHINE.
APPLICATION FILED NOV. 8, 1912.
1,174,884.
Patented Mar. 7, 1916.
6 SHEETS—SHEET 2.
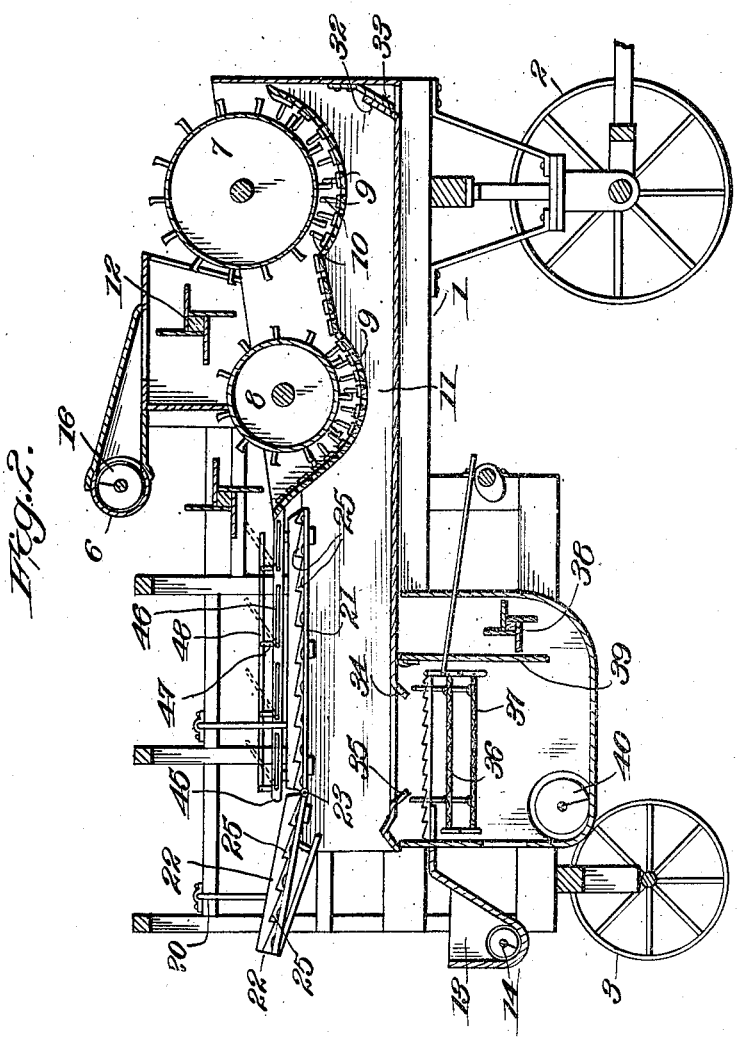
Witnesses
M. E. Dowe Jr.
E. J. Kramer.
Inventor
Frank McOsker
By Frank E. Rupp
Attorney

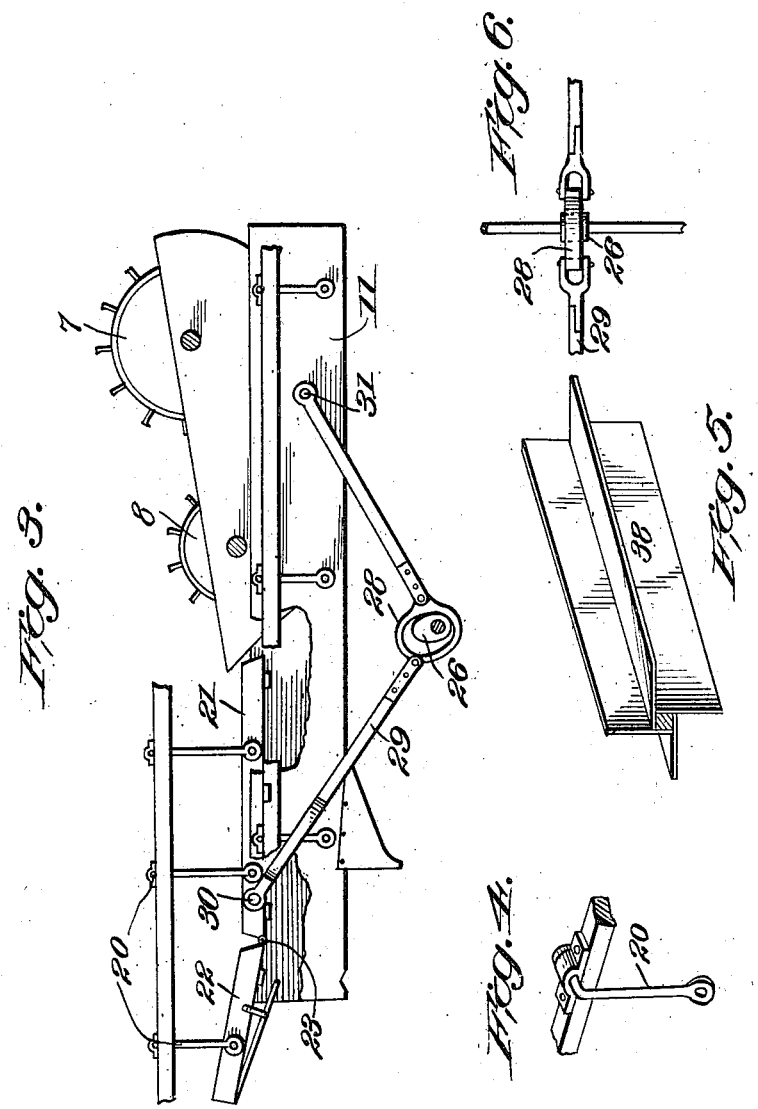

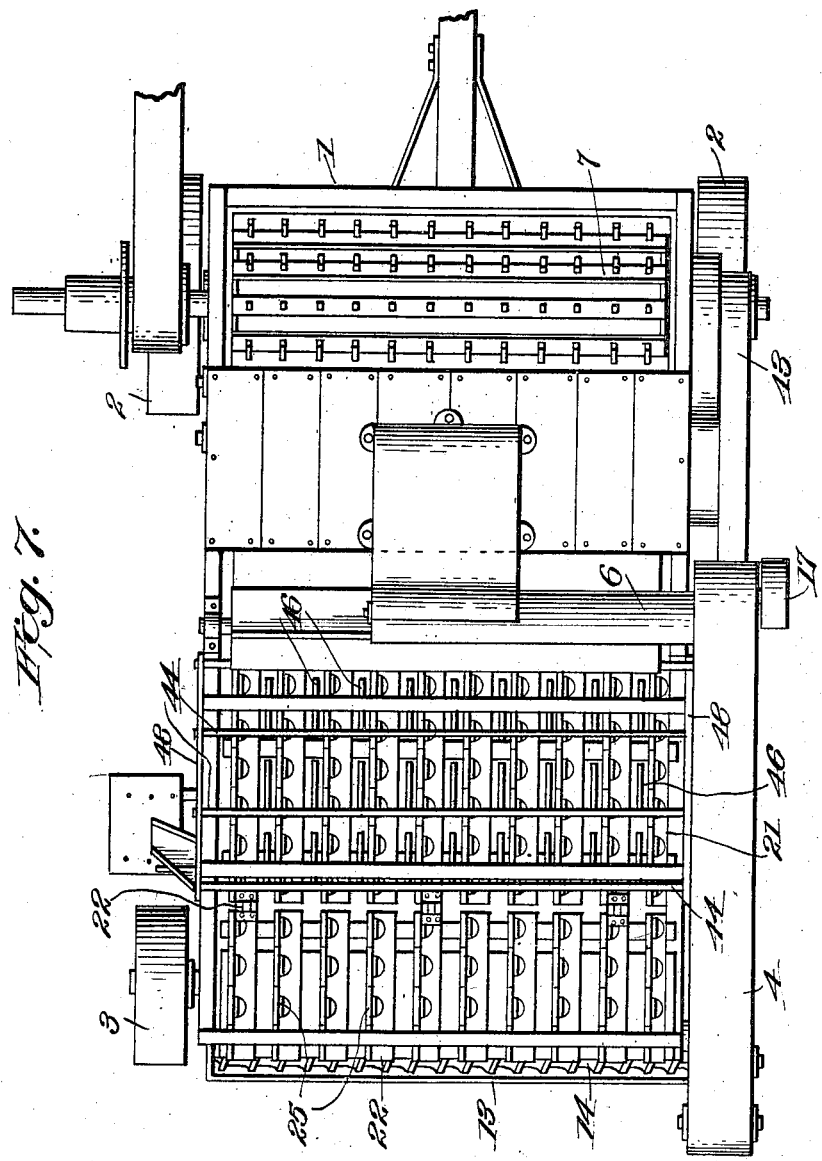

F. McOSKER.
THRESHING MACHINE.
APPLICATION FILED NOV. 8, 1912.
1,174,884.
Patented Mar. 7, 1916.
6 SHEETS—SHEET 5.
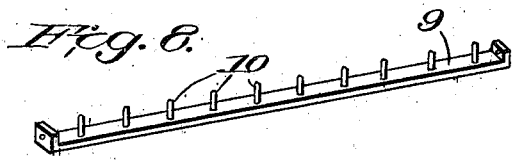
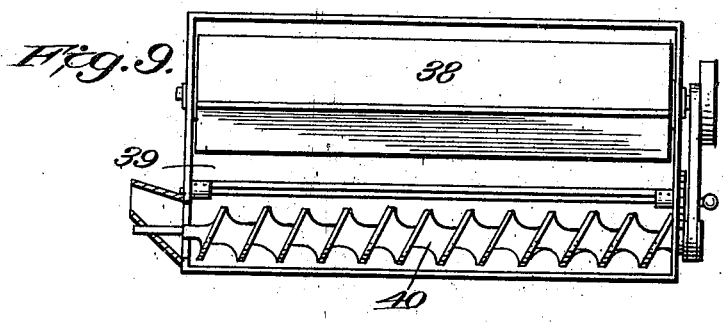

F. McOSKER.
THRESHING MACHINE.
APPLICATION FILED NOV. 8, 1912.
1,174,884.
Patented Mar. 7, 1916.
6 SHEETS—SHEET 6.
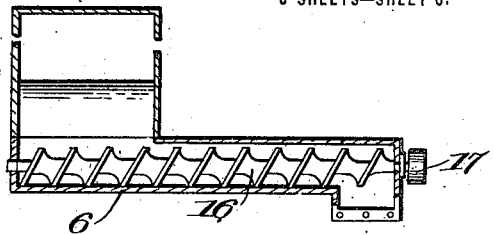
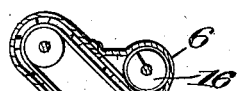
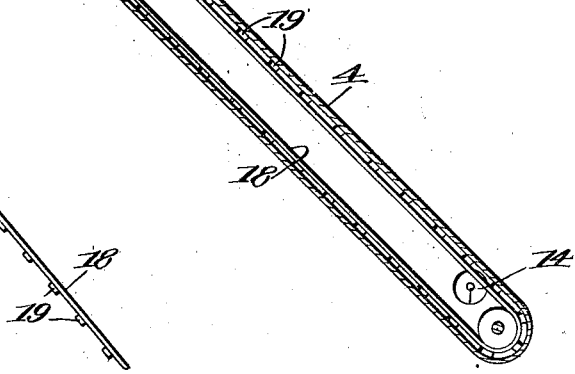
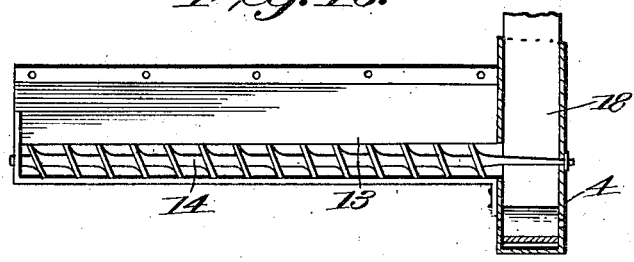

UNITED STATES PATENT OFFICE.

FRANK McOSKER, OF TURON, KANSAS.

THRESHING-MACHINE.

1,174,884.   Specification of Letters Patent.   Patented Mar. 7, 1916.

Application filed November 8, 1912. Serial No. 730,230.

*To all whom it may concern:*

Be it known that I, FRANK McOSKER, a citizen of the United States, residing at Turon, in the county of Reno and State of Kansas, have invented certain new and useful Improvements in Threshing-Machines, of which the following is a specification.

My invention relates to new and useful improvements in threshing machines and particularly to the two cylinder type of machines.

The object of my invention is to provide a threshing machine with two cylinders, one of said cylinders being of a smaller diameter than the other and arranged in the rear of the other cylinder.

Furthermore, the object of my invention is to provide a two cylinder machine having the concave arranged beneath the cylinder and a beater arranged between the cylinder in order that the straw after passing below the first cylinder is delivered to the second cylinder by the beater, thereby insuring the removal of all the grain from the straw.

Another object of my invention is to provide an improved means for carrying the heads which have not been thoroughly separated from the grain, after passing through the machine up and forward by means of an endless elevator and deliver them immediately in front of the several cylinders and in the rear of the first beater.

With the above and other objects in view the invention consists in general of a wheel supported frame whereon are mounted a series of cylinders, certain concaves, novel means for elevating the unthreshed straw and re-working the same together with certain shakers and sieves having an improved eccentric means for imparting reciprocating motion thereto.

Finally, the object of the invention is to provide a threshing machine of the foregoing described type which will possess advantages in points of simplicity and efficiency, consisting in the details of construction and in the arrangement and combination of parts to be hereinafter more fully set forth and particularly pointed out in the claim.

In describing the invention in detail reference will be had to the accompanying drawings forming part of this specification, wherein like characters denote corresponding parts in the several views and in which, Figure 1 is a side elevation of my improved threshing machine, Fig. 2 is a longitudinal vertical section therethrough, Fig. 3 is a sectional view showing the eccentric for imparting motion to the shaker and screens, Fig. 4 is a view of one of the hangers for supporting the shaker, Fig. 5 is a plan view of one of my improved beaters, Fig. 6 is a top view of the eccentric and eccentric strap, Fig. 7 is a plan view, Fig. 8 is a view of one of the bars of the concave showing the spikes, Fig. 9 is a plan view of the spiral grain conveyer, Fig. 10 is a sectional view of the straw carrying device showing the adjustable means of raising and lowering the straw cleats, Fig. 11 is a section of the cleat securing means, Fig. 12 is a view of the ratchet for adjusting the height of the sieves and wind board, Fig. 13 is a longitudinal section of the spiral conveyer located on the top of the machine, Fig. 14 a sectional view of the endless belt conveyer, Fig. 15 a section of the endless belt, showing the carrying ribs, and Fig. 16 a longitudinal section of the rear lower spiral conveyer.

In the drawings 1 indicates the frame of my improved threshing machine and is of any desired construction suitable for the mounting of the parts of the machine and 2 and 3 are the front and rear truck wheels which support the frame and by which the machine may be readily and easily moved to any location desired. I mount on the side of the frame an elevator casing 4 which is suitably supported by the V-shaped bracket 5. The casing extends from the lower rear end of the frame in a slanting direction toward the front of the machine where it terminates in a casing 6 extending approximately to the center of the machine where it has an opening extending into the interior of the machine.

I provide my improved machine with two cylinders 7 and 8 having the ordinary spikes secured to bars. The cylinder 7 being of a greater diameter than the cylinder 8 is located in the front of the machine and the cylinder 7 being of a smaller diameter is located in the rear of the first mentioned cylinder. Beneath each cylinder I provide a series of bars 9 on which I suitably secure teeth or spikes 10. The general plan of constructing the concaves is to make them in one solid piece with the spikes threaded therein, but I arrange them in a series of bars which are suitably secured beneath the cylinders and are a predetermined distance apart so the grain may fall through to the grain pan 11. In front of the cylinders 8 I provide a beater 12 which is located above and in front of the cylinder for the purpose of which will be hereinafter more fully set forth.

I provide immediately at the rear lower end of the machine a casing 13 which extends entirely across the machine and is provided with an opening extending its entire length. In this casing I secure a screw conveyer 14 and attached to one end I secure a small pulley wheel 15. In the casing 6 I also provide a screw conveyer 16 having a small pulley wheel 17 on the extreme of its shaft; within the casing 4 I arrange an endless belt 18 having transverse bars 19, on which the unthreshed grain heads are deposited by the screw conveyer 14 and carried up and deposited into the casing 6 where they are transferred to the interior of the machine by the screw conveyer 16 immediately in front of the rear cylinder 7 and as the unthreshed heads fall into the machine they strike the beater 12 which throws them with considerable force against the cylinder 7 which carries them beneath and rethreshes them, thus insuring a complete separating of the grain from the straw.

In the rear of the cylinders I attach by the hangers 20, shown in the drawing only on one side, but both sides are of similar arrangement, a shaker comprising two sections 21 and 22 hinged together at 23. By this construction I provide a shaker in which the rear portion can be adjusted to prevent the grain from being driven out with the straw. The fishbacks 25 are arranged in rows running longitudinally of the shaker and are suitably secured to the transverse bars of the shaker. In order that the shaker may have a reciprocating motion I provide an eccentric 26 suitably secured on a shaft which is rotated by the pulley wheel 27. An eccentric strap 29 has a rod 30 suitably secured at one end thereto and the opposite end of the rod I pivotally secure to the shaker frame or side rail at 31.

To receive the grain that falls through the shaker and also that which falls between the bars 9, I provide a grain pan 11 which extends the entire length of the machine and is provided with an upturned portion 33 at its front end and at its rear end with an approximately inverted V-shaped end, and also with an opening provided with downwardly deflecting plates 34 and 35. The inverted V-shaped end retards the outward movement of the grain and causes it to drop through the opening. The outer slanting edge diverts the unthreshed heads into the screw conveyer where they are again taken up and deposited in the machine as hereinbefore described. I provide a series of sieves 36 and 37 suitably secured in a frame which is given a reciprocating motion through the eccentric heretofore referred to. I also provide a fan 38 located below and in front of the sieves 36 and 37 and between the fan and sieves I provide a wind regulating board 39 suitably hinged at its upper edges and provided with means for adjusting the height of the same. In the lower rear end of the cleaning device I provide an ordinary screw conveyer 40 which conveys the grain to the exterior of the machine when it may be secured in the ordinary measure or sack.

It will be noted that I provide the cylinder with small pulleys 41 and 42 over which an endless belt 43 travels. The belt is so arranged as to impart motion to the fan, beaters, and conveyers, in the usual manner usually employed in threshing machines.

It is believed that the construction and operation of my improved threshing machine may be understood from the above description.

Having thus fully described my said invention, what I claim as new and desire to secure by Letters Patent is:

In a threshing machine, a frame, a pair of cylinders of different diameters arranged transversally on said frame in different horizontal planes, a concave under each of said cylinders, suitably secured on said frame, a return grain spout having its exit above and in front of said rear cylinder, a beater transversally secured in said frame beneath the opening of said grain spout in front of the rear cylinder, substantially as described.

In testimony whereof I affix my signature in presence of two witnesses.

FRANK McOSKER.

Witnesses:
L. G. HICKMAN,
WILLARD ZINCK.